Patented May 9, 1939

2,157,997

UNITED STATES PATENT OFFICE 2,157,997

METHOD OF TREATING POLYVINYL HALIDES

Samuel L. Brous, Akron, Ohio, assignor to The B. F. Goodrich Company, New York, N. Y., a corporation of New York No Drawing. Application June 16, 1938, Serial No. 214,052

8 Claims. (Cl. 260—88)

This invention relates to polyvinyl halides, and has as its object to provide a method of treatment whereby polyvinyl halides may be condensed to render them non-thermoplastic.

Polyvinyl halides are ordinarily formed by the polymerization of vinyl halides by actinic radiation or with polymerizing agents such as benzoyl peroxide. The product is thermoplastic and may be dissolved in solvents such as mesityl oxide and chlortoluene at elevated temperatures.

It has been proposed to heat vinyl ester resins with metallic compounds at high temperatures for long times until they have lost from about 10% to 50% or more of their weight. The products which were formed by the decomposition of the esters and removal of at least part of the acidic portion of the molecule were called pyroresins.

I have discovered, however, that when polyvinyl halides are heated with certain condensing agents, insoluble, non-thermoplastic products having substantially the same weight as the thermoplastic materials are produced, the loss in weight usually being insignificant and never over about one or two percent. The heating is continued at sufficiently high temperatures and for sufficient times, as hereafter explained, to cause a fundamental change in the properties of the compositions, but is stopped before a substantial loss in weight occurs. These condensing agents consist of the salts and oxides of iron, zinc, aluminum, tin, copper, nickel, cobalt, and manganese.

As a specific example of one embodiment of this invention, a plasticized polyvinyl chloride composition containing gamma polyvinyl chloride 100 parts by weight and tricresyl phosphate 75 parts was thoroughly mixed with 3 parts of zinc chloride. It was cured in a press for 20 minutes at 260° F. At the end of the cure it was much darker in color, had hardened considerably, had not appreciably changed in weight, was non-thermoplastic even when heated to a point where decomposition commenced, and was insoluble in hot chlortoluene and other solvents in which the original composition would dissolve completely. When similar tests were run with ferric chloride, it was found that as little as .002% would cause condensation, though from .02% to .1% carried the condensation to completion in a shorter period of time. Either anhydrous or hydrated metallic salts may be used.

I may also condense a polyvinyl halide solution with the metallic compounds of this invention. Ten parts by weight of gamma polyvinyl chloride were dissolved in 100 parts of warm chlortoluene. This solution was heated for one hour at 220° F. with .2 parts of ferric chloride. The solution darkened rapidly, and at the end of an hour it had completely gelled. Further heating at higher temperatures would not again liquefy the mass, and the addition of more solvent would not again give a homogeneous solution. This method is a particularly useful method of preparing non-thermoplastic protective coatings. The solution prepared above may be sprayed or painted on any surface. Heat is applied to evaporate the solvent and condense the polyvinyl halide whereby a flexible film which has great resistance to heat and solvents is formed.

Any salts such as the sulfates, nitrates, acetates, etc., or higher fatty acid derivatives such as the stearates, oleates, etc. of the metals previously mentioned will effect the condensation at varying speeds, though none are as satisfactory as the halides. Thus, when polyvinyl halide compositions are heated with ferric oxide, no condensation is noticeable at first, but after continued heating the condensation occurs. Ferric stearate is not as active as ferric chloride, but produces the same effect when polyvinyl halides are heated therewith.

The compositions containing the condensing agents should be heated at temperatures not less than 220° F. for practical results. I usually cure the compositions at temperatures between about 260° F. and 300° F., depending somewhat upon the amount of condensing agent used. Compositions containing one percent or less of active condensing agents such as ferric chloride can be heated without decomposition for some time, while compositions containing several percent of active condensing agent decompose much more readily. When ferric chloride is used as the condensing agent with compositions which are to be used at high temperatures, accordingly, only small proportions should be used. By regulating the amount of condensing agent and the time and temperature of the cure, however, compositions which are stable for long periods of time at any temperature below about 300° F. may be made, and by using the less active condensing agents, compositions which are stable over 300° F. may be prepared.

My invention finds many useful applications in the making of polyvinyl halide articles for use at elevated temperatures. Ordinarily, articles made of polyvinyl halides begin to soften at about 160° F. or lower, and they can seldom be used at temperatures of 212° F. or over. The stability of my new compositions, when properly prepared, at higher temperatures makes products made therefrom very useful as gaskets on steam and hot water lines. They can also be used in contact with hot solvents such as chlorotoluene, mesityl oxide, and other materials which dissolve the original thermoplastic compositions.

This application is a continuation in part of my copending application Serial No. 139,718, filed April 29, 1937.

While I have herein disclosed specific embodiments of my invention, it will be understood that this is only for the purpose of making the invention clearer and the invention is not to be regarded as limited to the details of operation, nor is it dependent on the soundness or accuracy of the reasons advanced for the advantageous results obtained. Many modifications such as the substitution of equivalent materials and the variation of proportions used are within the spirit and scope of the invention as defined in the appended claims.

I claim:

1. The method of reducing the solubility and thermoplasticity of a polyvinyl halide which comprises heating it with a member of the class consisting of the salts and oxides of iron, zinc, aluminum, tin, copper, nickel, cobalt, and manganese until condensation takes place and stopping said heating before a substantial loss in weight occurs.

2. The method of reducing the solubility and thermoplasticity of polyvinyl chloride which comprises incorporating therein an iron halide and heating until condensation takes place and stopping said heating before a substantial loss in weight occurs.

3. The method of reducing the solubility and thermoplasticity of polyvinyl chloride which comprises incorporationg therein a zinc halide and heating until condensation takes place and stopping said heating before a substantial loss in weight occurs.

4. The method of reducing the solubility and thermoplasticity of plasticized polyvinyl chloride which comprises incorporating ferric chloride therein and heating until condensation takes place and stopping said heating before a substantial loss in weight occurs.

5. The method of reducing the solubility and thermoplasticity of plasticized polyvinyl chloride which comprises incorporating zinc chloride therein and heating until condensation takes place and stopping said heating before a substantial loss in weight occurs.

6. The method of preparing a polyvinyl halide film which comprises incorporating in a polyvinyl halide solution a member of the class consisting of the salts and oxides of iron, zinc, aluminum, tin, copper, nickel, cobalt, and manganese, applying a layer of the solution to a surface, and heating until the solvent has evaporated and condensation takes place and stopping said heating before a substantial loss in the weight of the polyvinyl halide occurs.

7. The method of preparing a flexible, non-thermoplastic polyvinyl chloride film which comprises incorporating in a plasticized gamma polyvinyl chloride solution a member of the class consisting of the salts and oxides of iron, zinc, aluminum, tin, copper, nickel, cobalt, and manganese, applying a layer of the solution to a surface, and heating until the solvent has evaporated and condensation takes place and stopping said heating before a substantial less in the weight of the polyvinyl chloride occurs.

8. The method of preparing a flexible, non-thermoplastic polyvinyl chloride film which comprises incorporating ferric chloride in a plasticized gamma polyvinyl chloride solution, applying a layer of the solution to a surface, and heating until the solvent has evaporated and condensation takes place and stopping said heating before a substantial loss of weight of the polyvinyl chloride occurs.

SAMUEL L. BROUS.